Patented Dec. 24, 1940

2,226,134

UNITED STATES PATENT OFFICE 2,226,134

METHOD OF PURIFYING WATER

Otto Liebknecht, Neubabelsberg, near Berlin, and Herbert Corte, Berlin-Schoeneberg, Germany, assignors to The Permutit Company, New York, N. Y., a corporation of Delaware No Drawing. Application September 2, 1937, Serial No. 162,220. In Germany September 8, 1936

12 Claims. (Cl. 210—24)

This invention relates to methods of purifying water; and it comprises a method of removing acids from water wherein the water is passed in flowing contact with extended surfaces of an insoluble dyestuff of basic character such as anilin black, the dyestuff being occasionally regenerated by a treatment with dilute alkali solution; the method being particularly applicable in removing total solids from water by a double treatment wherein the water is first exposed to the action of acid-regenerated carbonaceous zeolites to replace metallic cations by hydrogen ions and is then exposed to the action of the stated basic dyestuff to remove anions, $CO_2$ being often removed as an intermediate step; all as more fully hereinafter set forth and as claimed.

There has recently come into use a method of removing cations from water, by passing the water in contact with carbonaceous substances of the cation exchange zeolite type but containing exchangeable hydrogen in lieu of the more usual sodium zeolites containing exchangeable sodium. Humic materials and certain sulfated preparations made therefrom are particularly useful in such procedures. In such treatment the salts in solution in the water, e. g. calcium carbonate, sulfate, etc., give up the metal constituent to the zeolite and the effluent water contains the corresponding acids, e. g. carbonic acid, sulfuric acid, etc. The base extracting substance, when exhausted, is revivified by treatment with a dilute acid. The effluent liquid from the carbonaceous hydrogen zeolites is partially or completely free of metal ions, which is desirable, but is acidic, which is undesirable in many uses, such as in boiler feed water for example. The carbonic acid can be eliminated by heat or by blowing out the $CO_2$ but the other acids are not easily eliminated. These acids may be neutralized, but that is of course undesirable in that it leaves salts in solution in substantially their original concentrations.

In accordance with the present invention these difficulties are avoided, and pure, neutral water obtained, by a process in which hard water is first passed in contact with a body of carbonaceous hydrogen zeolites, whereby the cations of the salts are removed, giving the corresponding acids, and then the acids are removed by passing the effluent liquid in contact with extended surfaces of a dyestuff capable of abstracting the acid. The final effluent is substantially free from foreign substances, is neutral, and is practically the same as distilled water.

After a time, the base extracting power of the hydrogen zeolites, and the acid abstracting power of the dyestuff, become exhausted and these materials are regenerated from time to time by treatment with solutions of an acid and of a base respectively.

Materials suitable for extracting acids according to the invention may be characterized as being insoluble basic dyestuffs; dyestuffs which (together with their salts) are insoluble in water, weak acids and weak alkalies, which have a basic character, and which will give up abstracted acid upon being treated with alkaline substances. Such dyestuffs usually are distinguished by having one or more amino groups or other basic groups capable of combining with acid to form salts while having sufficient complex groups to prevent any tendency to go into solution. Among suitable dyestuffs are: anilin black in its various forms (emeraldine, nigranilin, pernigranilin and "ungreenable anilin black"), and analogous oxidation products of other amines or amino mixtures. All these dyestuffs are basic in character, are nearly or quite insoluble in water, weak alkalies or weak acids, and are capable of taking up acids as described and of giving them up again upon treatment with aqueous caustic alkalies or other alkaline solutions.

If the dyestuffs as produced contain undesirable by-products, the dyestuffs may be subjected to a suitable purification prior to use. For example, anilin black may be extracted with acetic acid (glacial) or alcohol.

The dyestuff may be exposed to the water in various ways. When the dyestuff is sufficiently hard and strong to be granulated, it can be used directly in the form of a bed of granules. In such case the water is passed through a bed of the material and the bed is regenerated in a manner analogous to the manipulation of a zeolite softener. Optionally, the dyestuffs can be suspended in the liquid to be deacidified and when reaction is complete they can be separated from the liquids by filtration or settling, regenerated with alkaline solutions and used again.

When the dyestuffs occur in such finely divided form that the particles do not form a freely penetrable bed, it is best to convert the dyestuff into granules, cakes or conglomerations of the desired form and size by compression. Binding agents can be used in forming such granules. The binding agent should be one which can readily be washed out, or else be of an insoluble inert character. A particularly useful binding agent is the class of albumen-like substances such as glue which, after admixture with the dyestuff, can be converted to insoluble condition by coagulation as by heating or chemical action, as with formaldehyde. Sometimes pressing can be avoided; a coagulation taking its place. A commercial preparation of this type known as anilin black lacquer can be used.

Alternatively, if desired, the dyestuffs can be carried upon such carrier substances as wollen fibers, charcoal, activated carbon, cellulose, ceramic masses, pumice, etc. Glauconite (greensand) or zeolites can be used as carriers. In using the dyestuffs carried on wool, not only is the surface presented large, but also the wool itself has the power of abstracting acids.

The dyestuffs as such can be applied to the carrier agent, or they can be formed in situ therein by precipitation or reaction. Some of the basic dyestuffs on reduction give a water-soluble leuco product with which the carrier can be impregnated and the dyestuff re-produced by oxidation. Others, like anilin black, can be formed from soluble reagents with which the carrier may be impregated; production of the dye being subsequent. Some of the dyestuffs are soluble in organic solvents, such as alcohol. Carrier bodies can be impregnated with solutions of the dyestuffs and then allowed to dry. All these basic dyestuffs formed in this way, that is, by oxidation, are extremely inert and stable.

In regenerating the deacidifying dyestuffs after exhaustion, various alkaline solutions are useful. Dilute solutions of caustic alkali, sodium carbonate, sodium bicarbonate, ammonia and the like are useful and are best used in slight excess of the theoretical amounts.

In an example of a specific embodiment of the invention, hard water was passed through an acid-regenerated humic material whereby the cations were removed. The effluent water had an $H_2SO_4$ acidity corresponding to 0.0077 normal sulfuric acid. The water was passed through a container containing 100 grams of anilin black. Acidity was completely removed and it was only after a passage of 17 liters that slight traces of sulfuric acid appeared in the effluent. The substance took up 6.4 grams sulfuric acid which is about half the quantity of sulfuric acid theoretically required for formation of the corresponding salt of the dye. When acidity appeared in the effluent the run was stopped but the dye at this time still had the power of removing and fixing acid. If the water to be treated contains dilute hydrochloric acid in lieu of sulfuric about 60 per cent of the theoretical quantity can be fixed prior to acid appearing in the effluent.

The anilin black was regenerated with a dilute solution of sodium carbonate, in amount about 20 per cent more than that required to neturalize the acid fixed thereby. After washing out the soda solution the acid removing ability of the bed was found to be completely restored. The amount of regenerating agent (alkali), however, rarely need be more than 10 per cent in excess of theoretical and can sometimes be less than 10 per cent in excess. It is better to use as slight an excess as possible, since then the regenerating agent is more readily washed out of the dyestuff.

While the invention has been described in connection with removing acids from the effluent from hydrogen exchange softeners, it can, of course, be used in abstracting acids from water of other origin. The acids can be organic as well as inorganic. The process can be used to produce fresh water from sea water, by successive treatments thereof with hydrogen zeolites and dyestuff.

One way of securing well supported extensive areas of dye for the treatment of flowing water is to impregnate or coat a granulated inert silicate, such as pumicestone, with glue, tan it in place, using formaldehyde, chromates, tannin, etc., and then dye it. Using anilin black, the dye may be applied in the leuco form and then oxidized in the usual ways, as by chlorates.

In the various expedients mentioned, extensive active surfaces of the dye are obtained using but a small amount of dye. However, granular useful materials consisting of anilin black, materials of the anilin black group, oxidation products of amines and amino mixtures can be obtained by various expedients. One is to prepare a hydrochloride or another salt as a precipitate in a solution, usually dilute, and to filter off the precipitate as a press cake. These press cakes are then dried. The dried hard cakes split into more or less small pieces which, in water, often split up further. Mechanical reduction to the desired granule size can be used. Granules so obtained suffer no appreciable change in the alternating phases of water treating; abstracting acids from water and regeneration with alkaline solution. The granules exhibit sufficient physical hardness and porosity for most purposes but the physical solidity can be increased by incorporation of organic or inorganic binding materials such as a solution of nitrocellulose or another cellulose ester. It is possible to use viscose solutions or "cellulose emeraldine."

In one particular embodiment of this preparation of water treating material in granular form, about 150 parts by weight of anilin is converted into emeraldine hydrochloride in about 1000 parts of water, using hydrochloric acid, sodium chlorate and oxygen carriers or catalysts (vanadium or iron compounds or amino-phenols). It is advantageous to effect the oxidation in the cold as, for instance, at 0° to 30° C. The oxidation is rather slow and is completed in 36 to 48 hours. The emeraldine hydrochloride is filter-pressed, washed and dried. It is not necessary to effect complete washing with removal of all soluble substances, since the desired type of granule can be obtained after treating, even without washing. Soluble materials may be washed out of the granules. However, preliminary washing seems to be of advantage as regards the hardness of the end products. Drying can be at the ordinary temperature or higher as, for instance, at 100° C. Slow drying seems to favor good physical properties in the product. The granulated material so obtained, after treatment with dilute alkali solution, as described, is suitable for use in pervious bed apparatus of the type of the ordinary softeners, being hard and resistant. Grain sizes passing a screen with 81 meshes to the square centimeter and held back on screens of 400 meshes are useful. On introduction into the water a certain amount of swelling occurs, up to several times the original volume, about 200 to 250 grams of the dry granules occupying a new volume of about 1000 cc., for example.

If the corresponding methylated dyestuff is prepared in the same manner and in the same dilution from o-toluidine, an exceptionally good, very resistant product is obtained, which after suitable granulation can be used with excellent results.

If the concentration of the batch which is described above for preparation of emeraldine hydrochloride is appreciably higher, for instance triple the concentration, a very much softer and more readily decomposed material is obtained, in connection with which the use of a binding agent is recommended.

On the other hand with a dilution greater than that stated above, still harder cakes are obtained which exhibit a mechanical resistance still greater than that stated according to the above described instructions. If one works, for instance, with approximately triple the dilution, emeraldine hydrochloride is obtained after drying which exhibits a weight per unit volume about 1½ to 2 times as great as that described above. The effectiveness of the products, i. e. the absorption capacity for acids, rises correspondingly, calculated on the unit of space.

If in place of anilin, for instance, metaphenylene diamine is used, a product is obtained here also which is mechanically strong and is exceptionally resistant to the alternating actions of alkali and acid.

Similar conditions exist also for the other basic dyestuffs as for anilin. Insoluble oxidation products analogous to anilin black in the capacity of taking up acids are formed for example from anilin chloride, toluidin, naphthylamins or polyamins, like for instance m-phenylene diamine or other homologues of substitution products, e. g. hydroxy- and amino group containing compounds, like amino phenols. The latter as mentioned above can also serve as catalysts. The preparation of the emeraldine or products related or similar to it, may be carried out with the use of other catalysts or also other acids.

It has often proved advantageous, in preparing these solid amino compounds, after complete mixing of the reaction solution by stirring, for example, to let the solution stand without further mixing, whereupon a jelly results; the liquid is converted into a gel-like mass without separation of free liquid. It is further advantageous to permit the conversion to take place at low temperatures, for instance at 0–30°.

It has further been found suitable in starting the batch for preparation of the dyestuffs, to add protective colloids to the solutions, soluble albumin, glue or gelatin, soluble bodies obtained by hydrolysis of keratin etc. etc., or wetting out materials such as are used in the textile industry, sulfated oils such as Turkey red oil or similar substance such as a soap of sulfated fatty alcohols, such as "Igepon", laurol, etc. The use of these substances causes a precipitation of the dyestuffs in greater dispersion, whereby the colloidal character of the precipitates is increased still more. Better gels can be made. Materials giving precipitates with components of hard water (lime) or with acids, are not desirable.

It has been found that in working with very dilute solutions, for instance, even in the dilution stated above, granular materials can also be obtained if the hydrochloride or the salts obtained with other acids, in the solution in which they were formed, are immediately transformed to the corresponding base which is then pressed off and dried, or if the pressed off salts are transformed to the base after pressing off, or after washing out if that is desirable. In this connection one can proceed in such a way that this conversion immediately follows the pressing or washing, or in such a way that the salts are dispersed once more in water and the conversion to the base is then effected by addition of alkaline reacting substances. However, the products obtained in this manner are generally inferior with respect to mechanical stability to those obtained from the salts. Here also it is advantageous to carry out a solidification as described above.

Commercial emeraldine can be produced in other ways than that described, as for example, in alkaline solution. Any of the catalysts used in preparing dyestuffs of the type of anilin black can be used in the present invention. However, vanadic acid or ferric chloride are good catalysts. Using ferric chloride it is possible to work in more acid solution than with vanadic acid. It is desirable to have enough acid to produce final products which will set to gels. The condition of the gels affects the hardness of the final dry products, which is also affected by the other factors previously mentioned.

Useful granular materials capable of use in a pervious bed for an indefinite time with alternate treatments with water containing acids to be removed and an alkaline regenerating solution can be made by producing anilin black as a wet gel, using the ordinary chemical methods. This wet gel is dried in much the same manner used with alumino silicate gels until it reaches a certain stage of dryness. The dried gel when placed in water snaps up into granules and additional crushing and screening are then applied to obtain granules of the desired size.

What we claim is:

1. A method of removing an acid from water comprising bringing the water containing an acid into contact with a solid basic oxidation product of an organic aromatic amine that is insoluble in dilute acids and alkalies and that forms salts insoluble in dilute acids and alkalies, and thereafter regenerating said product by treating it with an alkaline solution to restore its acid removing properties.

2. A method of removing an acid from water comprising contacting such water with a solid oxidation product of aniline that is insoluble in dilute acids and alkalies and that forms salts insoluble in dilute acids and alkalies, and thereafter regenerating said product with an alkaline solution to restore its acid removing properties.

3. A process of reducing the solids content of water containing a salt in solution comprising bringing such salt solution into contact with a hydrogen exchanging cation-exchange material to remove the cations of said salt from the water in exchange for said hydrogen, and thereafter removing acids left therein by bringing the water into contact with a solid basic oxidation product of an organic aromatic amine that is insoluble in dilute acids and alkalies and that forms salts insoluble in dilute acids and alkalies.

4. A cyclic process of conditioning water having an acid dissolved therein comprising flowing such water through a bed of a granular anilin black, interrupting the flow of said water, regenerating said anilin black with a basic solution, and thereafter continuing the flow of said water through said bed.

5. A process as defined in claim 4 in which the anilin black is emeraldine.

6. The method of claim 1, wherein the oxidation product is supported on carrier bodies.

7. The method of claim 1, wherein the oxidation product is used in the form of compressed granules.

8. The method of claim 1, wherein the oxidation product is in admixture with coagulated albuminous substances.

9. The method of claim 1, wherein the oxidation product is supported on wool fibers.

10. The method of claim 1, wherein the oxidation product is in the form of an impregnation of porous carrier bodies.

11. The method of claim 1, wherein the oxidation product is an anilin black.

12. The method of claim 1, wherein the oxidation product is a graular material obtained by precipitating a salt of the base, washing and pressing the precipitated material, granulating and treating it with a dilute alkaline solution.

OTTO LIEBKNECHT.
HERBERT CORTE.